United States Patent [19]
Aslanidis et al.

[11] Patent Number: 5,929,801
[45] Date of Patent: Jul. 27, 1999

[54] METHOD FOR REPEATING INTERROGATIONS UNTIL FAILING TO RECEIVE UNINTELLIGIBLE RESPONSES TO IDENTIFY PLURALITY OF TRANSPONDERS BY AN INTERROGATOR

[75] Inventors: Konstantin O. Aslanidis, Dachau, Germany; Alain Berthon, Cagnes Sur Mer, France

[73] Assignee: Texas Instruments Incorporated, Dallas, Tex.

[21] Appl. No.: 08/893,822

[22] Filed: Jul. 11, 1997

[51] Int. Cl.[6] ........................................... G06F 13/00
[52] U.S. Cl. ................................ 342/44; 342/51; 342/42
[58] Field of Search ............................. 342/44, 51, 42, 342/50; 340/825.54

[56] References Cited

U.S. PATENT DOCUMENTS

| | | | |
|---|---|---|---|
| 5,434,572 | 7/1995 | Smith | 342/44 |
| 5,489,908 | 2/1996 | Orthmann et al. | 342/42 |
| 5,521,602 | 5/1996 | Carroll et al. | 342/50 |
| 5,602,538 | 2/1997 | Orthmann et al. | 340/825.54 |
| 5,673,037 | 9/1997 | Cesar et al. | 340/825.54 |
| 5,793,324 | 8/1998 | Aslanidis et al. | 342/51 |

*Primary Examiner*—Le Hien Luu
*Attorney, Agent, or Firm*—Rebecca Mapstone Lake; Richard L. Donaldson

[57] ABSTRACT

A novel addressing scheme for an RF-ID system or LAN network is presented in which an interrogator(reader) addresses a set of transponders, each transponder in this set having a common addressing scheme, and the addressed transponders respond only upon the matching of their own address with the received addressing scheme. The addressing scheme comprises a fixed size sub-address and a variable size mask. For example, assuming that the transponder address is 32 bits, the implementation of the addressing scheme can choose 4 bits for the size of the sub-address and 0, 4, 8, 12, 16, 20, 24, 28 bits for the size of the mask. By varying the addressing scheme according to the algorithm in FIG. 4, the reader will in time interrogate all the transponders individually, thus receiving their unique address and achieving the requested exhaustive inventory.

30 Claims, 4 Drawing Sheets

FIG. 1

| MSB | | | | | | | LSB | |
|---|---|---|---|---|---|---|---|---|
| 1 | E | F | 5 | 4 | 6 | 7 | 8 | TRANSPONDER ADDRESS |
| | | | | 4 | | | | RECEIVED SUB-ADDRESS |
| | | | | | 6 | 7 | 8 | RECEIVED MASK |
| * | * | * | * | | | | | |

* MEANS "DON'T CARE"

FIG. 2

| MSB | | | | | | | LSB | |
|---|---|---|---|---|---|---|---|---|
| 1 | E | F | 5 | 4 | 6 | 7 | 8 | TRANSPONDER ADDRESS |
| | | | | 7 | | | | RECEIVED SUB-ADDRESS |
| | | | | | 6 | 7 | 8 | RECEIVED MASK |
| * | * | * | * | | | | | |

* MEANS "DON'T CARE"

FIG. 3

| MSB | | | | | | | LSB | |
|---|---|---|---|---|---|---|---|---|
| 1 | E | F | 5 | 4 | 6 | 7 | 8 | TRANSPONDER ADDRESS |
| | | | | 4 | | | | RECEIVED SUB-ADDRESS |
| | | | | | 3 | 7 | 8 | RECEIVED MASK |
| * | * | * | * | | | | | |

* MEANS "DON'T CARE"

Reader Algorithm function push (mask, address)   ; pushes on private stack
function pop (mask, address)   ; pops on private stack function poll_loop (sub_address_size as integer)

pop (mask, address)
mask = address and mask   ; generates new mask for sub_address = 0 to (2^sub_address_size-1)

broadcast (selective_poll_cmd, mask, sub_address)

if no_collision_is_detected then
; *transponder is inventoried*
        store (transponder_id)
    else
; *remember a collision was detected*
        push (mask, address)
    endif next sub_address ; *if some collisions have been detected and not yet processed,*
; *the function calls itself recursively to process the last stored* if stack_not_empty then poll_loop (sub_address_size)

end poll_loop main:

mask = null
address = null
push (mask, address)

poll_loop (sub_address_size)

end_main

*FIG. 4*

DATA

| TRP_NB | AVERAGE SELECTIVE_ POLL | | SELECTIVE_ POLL_NB | CYCLE_NB | COLLISION_ NB | |
|---|---|---|---|---|---|---|
| 1 | 1 | 1 | 100 | 100 | 0 | |
| 6 | 1 | 0.166667 | 88 | 188 | 100 | 88 |
| 11 | 3 | 0.272727 | 61 | 361 | 100 | 261 |
| 16 | 5 | 0.3125 | 85 | 585 | 100 | 485 |
| 21 | 7 | 0.333333 | 99 | 799 | 100 | 699 |
| 26 | 10 | 0.384615 | 15 | 1015 | 100 | 915 |
| 31 | 12 | 0.387097 | 12 | 1212 | 100 | 1112 |
| 36 | 14 | 0.388889 | 2 | 1420 | 100 | 1320 |
| 41 | 15 | 0.365854 | 81 | 1581 | 100 | 1481 |
| 46 | 17 | 0.369565 | 36 | 1736 | 100 | 1636 |
| 51 | 19 | 0.372549 | 26 | 1926 | 100 | 1826 |
| 56 | 20 | 0.357143 | 31 | 2031 | 100 | 1931 |
| 61 | 21 | 0.344262 | 86 | 2186 | 100 | 2086 |
| 66 | 22 | 0.333333 | 86 | 2286 | 100 | 2186 |
| 71 | 24 | 0.338028 | 94 | 2494 | 100 | 2394 |
| 76 | 26 | 0.342105 | 7 | 2607 | 100 | 2507 |
| 81 | 27 | 0.333333 | 83 | 2783 | 100 | 2683 |
| 86 | 29 | 0.337209 | | 2900 | 100 | 2800 |
| 91 | 31 | 0.340659 | 17 | 3117 | 100 | 3017 |
| 96 | 31 | 0.322917 | 95 | 3195 | 100 | 3095 |

METHOD FOR REPEATING INTERROGATIONS UNTIL FAILING TO RECEIVE UNINTELLIGIBLE RESPONSES TO IDENTIFY PLURALITY OF TRANSPONDERS BY AN INTERROGATOR

FIELD OF THE INVENTION

This invention relates in general to information/data transfer systems and more particularly to the inventorying of a multiplicity of transponders within a given read range or the identification of remote stations on a LAN or WAN network. The term "transponder" and "station" will be used in the same meaning in the description below.

BACKGROUND OF THE INVENTION

In the realm of RF-ID many problems exist but present themselves as merely trade-offs of technology. For example, the read range of an interrogator may have a certain limit, but the limit is based on technological distinctions such as size of the read antenna or orientation of the transponder with respect to the interrogator, or perhaps FCC regulations. However, reading a multiplicity of transponders within any given read range presents itself in a much different light Reading a multiplicity of transponders presents itself in applications such as inventory control, asset management or hands-free access control. Inherently, the problem arises when several transponders within the read range of an interrogator respond simultaneously on a unique communication channel to a global (broadcast) interrogation signal. What results from this simultaneous transmission is an unintelligible signal at the interrogator's receiver. In other words, neither transponder is identified, the whole purpose of the RF-ID system is defeated.

Previously, solutions to the collisions have ranged from addressing a particular transponder to time delaying each transponders response a unique amount of time according to each transponder. Of course, both of the mentioned previous solutions add additional time to read all the transponders within the read range because of having to individually address each transponder or because of having to wait for the sum total of all transponder wait times plus responses, making the entire RF-ID system less efficient. In addition, even when individually addressing transponders, the issue is that the address of each individual transponder is initially unknown, since the transponders present within the reader range are just a sample of a much larger population (several millions or even hundred of millions). It is a bit like attempting to call each member of a group of persons by its name before even knowing this name. A similar situation exists on a computer network (LAN or WAN) when the address of all stations (computers) are unknown.

Mechanisms for solving these problems exist, for instance, such as Collision Detection, followed by random retry. However, while these mechanisms can easily be implemented on sophisticated computers, they are much too complex to be implemented on low-cost devices such as transponders. Moreover, the fact that the transponders are battery-less (or at least power consumption conscious) implies that it is difficult or even impossible to keep a record of previous transactions. Thus, it should be the responsibility of the reader to handle the entire responsibility of inventorying.

Considering a population of several hundred millions, scanning the whole range of addresses is unpractical because it would take a prohibitive length of time. A more practical approach has been proposed in a previously filed application, Ser. No. 08/588,657 filed on Jan. 19, 1996, and assigned to Texas Instruments Incorporated, where only a part of the transponder address, the sub_address, is scanned (the Less Significant 4 Bits on a 32 bits address for instance). In the case of this example, there are 16 different positions (2 power 4): if only two transponders are located within the field, the probability that any two transponders have the same sub-address is $\frac{1}{16}$ or 6.25%. This probability will increase in proportion with the number of transponders. One way to reduce this probability is to increase the size of the sub-address, for instance to 8 bits instead of 4 bits. However, doing so increases the reading time without even being 100% sure of avoiding all collisions, i.e. reading all of the transponders located within the read range.

If N is the size of the sub_address and T is the number of transponders in the field, the inventorying time is: $2^N$*reader_request_time+T*transponder_response_time. Assuming 20 transponders exist within the read range, a reader request time of 50 ms, a transponder request time of 30 ms and a sub-address on 8 bits, the inventorying time is: $2^8$*50 ms+20*30 ms=12,600 ms+600 ms=13,400 ms or 13.4 seconds . . . and the probability that a collision will result (i.e. not being able to inventory two or more transponders) is 52.4%. The required time of 13.4 seconds is deemed unacceptable by the market. Thus the need has arisen for a system capable to address efficiently this market requirement, both in terms of timing and cost of implementation (meaning that most of the intelligence must be in the reader system).

SUMMARY OF THE INVENTION

The above-mentioned problems are solved in this invention in that the interrogator(reader) addresses a set of transponders, each transponder in this set having a common addressing scheme, and the addressed transponders respond only upon the matching of their own address with the received addressing scheme. The transponders address is some sub-set of the transponders identification code. The addressing scheme comprises a fixed size sub_address and a variable size mask. For example, assuming that the transponder address is 32 bits, the implementation of addressing scheme can choose 4 bits for the size of the sub_address and 0, 4, 8, 12, 16, 20, 24, 28 bits for the size of the mask. Initially the interrogator transmits a null mask and a variable address ranging from 0 to ($2^{sub\text{-}address\ size}-1$). Upon receipt of collision, the interrogator stores the collision addresses. Then one collision address at a time, the interrogator transmits a new series of interrogation commands using the previous collision address as the new mask and then cycling through the sub-addresses as previously done (from 0 to ($2^{sub\text{-}address\ size}-1$)). Then once that particular collision address has been cycled through, another collision address is used as the mask for the next series of interrogation commands, repeating the abovedescribed procedure until all collision addresses have been used as masks for a new series of interrogation commands. The collision masks and addresses from each series of interrogation commands are then again saved and used as the mask for the next series of interrogation commands and so on and so forth. By varying the addressing scheme by either varying the mask or the position within the identification code which designates the sub-address, the reader will in time interrogate all the transponders individually, thus receiving their unique address and achieving the requested exhaustive inventory

BRIEF DESCRIPTION OF THE DRAWINGS

FIGS. 1, 2 and 3 show examples of masks and sub-addresses which either result in a match with the transponder or not.

FIG. 4. shows the reader algorithm according to a preferred embodiment of the invention programmed in software.

DETAILED DESCRIPTION OF THE PREFERRED EMBODIMENTS

Figure 5:
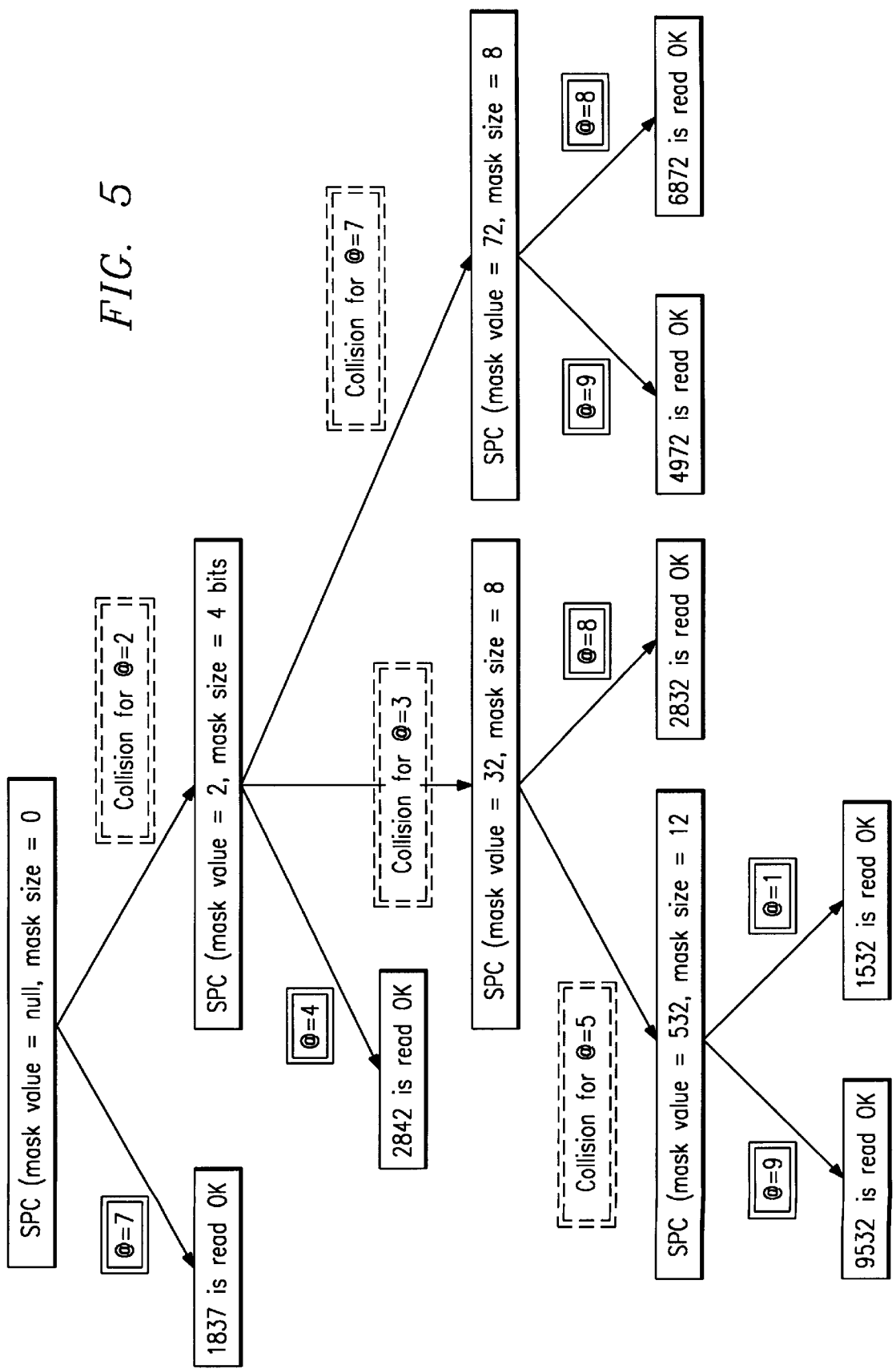
FIG. 5 shows an implementation of the reader algorithm according to a preferred embodiment of the invention as a tree diagram

In order to better define the invention, certain assumptions will be made with respect to the make-up of the transponder and reader and the transmission protocol of the interrogator. The first assumption is that each transponder is uniquely identified by a unique Identification (ID) code, also called its address. The number of address bits will depend upon the total population of transponders within the read range of the interrogator. For example, a 32 bit address will provide up to 2.2 billion unique addresses and therefore identify up to 2.2 billion transponders. The second assumption is that the reader has the ability to detect that more than one transponder has responded, thus generating a collision. The collision detection mechanism is implementation specific. The third assumption is that the reader has the ability to send commands and parameters to the transponders and that the transponders have the ability to process them. These assumptions are intended to aid in the explanation of the invention and are not intended to limit the scope of the invention.

One of the elements of a first preferred embodiment of the invention is the "Selective Poll Command" sent by the reader to all transponders/stations. This command has two parameters, the mask and the sub-address. Upon receipt of a "Selective Poll Command"(SPC), each transponder responds only if the concatenation of received sub-address value and mask value matches the least significant bits of its address or if the SPC is "satisfying the addressing scheme conditions". FIGS. 1, 2, and 3 provide examples on how a transponder responds to such a command, according to various addressing schemes, i.e. various values of the sub-address and of the mask. Starting with the LSB is purely convention. One could as well start with the MSB, or even in an arbitrary but well known order. For example, according to a second embodiment of the invention, instead of the command sending a mask and a sub-address, the command would send an address and also a command instructing the transponders as yet unidentified to use as a sub-address a different set of bits within their identification code, i.e. instead of using the 4 least significant bits, using bits 27–30 or bits 9–12 to compare the sub-address to. More critical to the first embodiment of the invention is that the mask is built, step by step from the sub-addresses having caused collisions, as explained below in the reader algorithm shown in FIG. 4.

If more than one transponder satisfies the addressing scheme conditions as specified by the Selective Poll command sent by the reader, collisions will result and the interrogator will fail to receive any intelligible identification codes from the myriad of transponders, but will detect that a collision has occurred (assumption 2).

A second element of a first preferred embodiment of the invention is the algorithm used by the reader to inventory the transponders, using the Selective Poll Command, as shown in FIG. 4. A poll cycle is defined as the sending of a succession of Selective Poll Commands and sub-commands by the reader, with a fixed mask value and a sub-address value varying from 0 to its maximum value ($2^{sub\text{-}address\ size}-1$), i.e. for a sub-address size of 4, the maximum sub-address is 15. The structure and actual implementation of the "Selective_Poll Command" will vary from one system to another, in order to stay compatible with the existing command structure. For example, the implementation may take one of these two structures. The first example of a Selective Poll Command is a sequence of ($2^{sub\text{-}address\ size}$) sub-commands, each sub-command comprised of the same mask value and a sub-address value varying from 0 to its maximum value ($2^{sub\text{-}address\ size}-1$). This type of implementation is independent of the physical layer used for the command transmission and is likely to be chosen for an implementation on a LAN/WAN. A second example of the Selective Poll Command is a unique command within which the mask value is a variable parameter, and is then followed by ($2^{sub\text{-}address\ size}-1$) power pulses, each pulse incrementing the sub-address checked by each transponder, such incrementing the sub-address as described in a previously filed application, Ser. No. 08/588,657 filed on Jan. 19, 1996, and assigned to Texas Instruments Incorporated. This type of implementation performs especially well since the command code and the mask value needs to be sent only once per poll cycle. This implementation is likely to be used for an implementation on transponders.

The reader algorithm description is as follows. During the first poll cycle, the reader sends all transponders a Selective Poll Command, with, as parameters, a null mask (mask length is zero), and a variable sub-address(sub-address size remains constant), which will vary from 0 to ($2^{sub\text{-}address\ size}-1$) during this cycle, as described above. During each poll cycle (the first one and any subsequent), if an intelligible response is received from a transponder, the reader stores the received address. The transponder is then uniquely identified. If an unintelligible response (collision) is received instead, the reader stores in its memory the combination of mask and sub-address which has caused this collision. Thus, at the end of each poll cycle, the reader has a list of where and how many collisions have taken place and the corresponding addressing schemes, each made of the mask and the sub_address having caused the collision.

During the next read cycle, the reader retrieves from its memory one of the such stored combination of mask and sub-address and sends to all transponders a Selective Poll Command, with, as parameters, a mask equal to the concatenation of the just retrieved sub-address and the mask, and a new sub-address(starting from a value of zero). The following sub-commands will then consist of the same concatenated mask and the variable sub-address from the initial value of 0(mentioned above) to ($2^{sub\text{-}address\ size}-1$). Then the next such stored collision combination of mask and address forms the new mask for another series of Selective Poll Commands and sub-commands and so on and so forth until all previous collision addresses have become new masks for the next series of Selective Poll Commands and sub-commands. Further, if during these subsequent poll cycles collisions occur, the reader stores in its memory the combinations of mask and sub-address which have been the cause of the collisions, as described above. Then the collision sub-address and mask concatenated form the new mask for the next read cycle and the cycle repeats itself until no collisions are detected.

The reader performs such read poll cycles until all the stored combinations (mask, sub-address) have been processed. At this stage all transponders have been inventoried.

The order in which the subsequent poll cycles are executed is not important. For example, it is possible to detect all collisions for a given mask and the process them, or process each collision as soon as it occurs, and then detect further collisions for a given mask. The choice of one principle or the other will depend upon the Selective Poll Command implementation and will generally driven by performance considerations.

The structure and actual implementation of the "Selective_Poll Command" will vary from one system to another, in order to stay compatible with the existing system's architecture. As an example, the structure of the "Selective Poll Command" could be as follows, assuming a Transponder Id on 32 bits and a Sub-Address Size of 4 bits.

| Parameter | Size | Value |
|---|---|---|
| Command Code | 4 bits | implementation specific |
| Mask Size | 8 bits | 0–28 |
| Mask Value | 0–28 bits | variable, reader defined |
| Sub-Address Size | 4 bits | 4 |
| Sub-Address Value | 4 bits | 0–15 |

The Sub-Address Size can be a system parameter, and thus may not been required in the command parameters. The Sub-Address Value will be varied by the reader from zero to its maximum value of ($2^{sub\text{-}address\ size}-1$) as described above.

An example of the algorithm according to the invention in practice is shown in FIG. 5. In FIG. 5, the tree addressing scheme according to a first preferred embodiment of the invention is shown. A sub-address length of 4 bits and a mask length of 0 bits is initially shown. The interrogator transmits a mask of null value, and a variable value sub-address, such that the first transmission consists of a mask of 0 and a sub-address of 0. Then the second transmission would be a mask of 0 and a sub-address of 1 etc., ever increasing the sub-addresses until a full interrogator starts a new interrogation cycle is complete. If collisions are detected along the way, then those sub-addresses where the collisions were detected are stored. After the full interrogation cycle is complete, i.e. all the sub-addresses have been transmitted, then the interrogator starts a new interrogation cycle with a mask size of 4 bits(to accommodate all the collision sub-addresses), and uses as the mask value, the collision sub-address. Therefore, as shown in FIG. 5 if when the sub-address of 2 was transmitted, a collision was detected, then the next interrogation cycle would start with a mask of 2, and then cycle through the sub-addresses, 0 through ($2^{power\ sub\text{-}address\ size}-1$). If during this second interrogation cycle a collision was then detected at mask value 2, sub-address value 3, and at mask value 2, sub-address value 7, then two more branches of the tree would abound and a third interrogation cycle would start with a mask of 23 and the fourth interrogation cycle would start with a mask of 27 and then as previously described, the interrogations would transmit the new masks and cycle through the sub-address of 0 to ($2^{sub\text{-}address\ size}-1$) performing one branch at a time. And the process continues with the collision mask and sub-address concatenated forming the new mask for the next set of Selective Poll Commands and sub-commands until all the transponders in the field are identified.

In another preferred embodiment according to the invention, an interesting possibility provides an extension of the invention. It might be possible that although two or more transponders responds to a Selective Poll Command, and thus that a collision should be detected by the reader, this collision is not actually detected. This may occur, for instance, when one of the transponder has a RF signal much stronger than the others, for instance because it is closer the reader antenna or because its own antenna is able to generate a stronger filed than other transponders antennas. Failing to detect the collision means that the transponders who have answered will not be inventoried. An easy solution to this problem is to implement a Quiet Command, which is effected via a transponder address. In other words, a transponder receiving a Quiet Command with an address equal to its own ID/address will enter into a Quiet mode and will not respond to any subsequent Selective Poll Command, until the Quiet mode is exited by some means such as reception of another command type or a reset (power-off or something else). Upon completion of the first inventory cycle (i.e. all detected collisions have been detected), the reader sends a Quiet Command to every inventoried transponder, and starts a new inventory cycle. This process can be repeated until no transponder is inventoried during an inventory cycle.

Figures 6, 7:
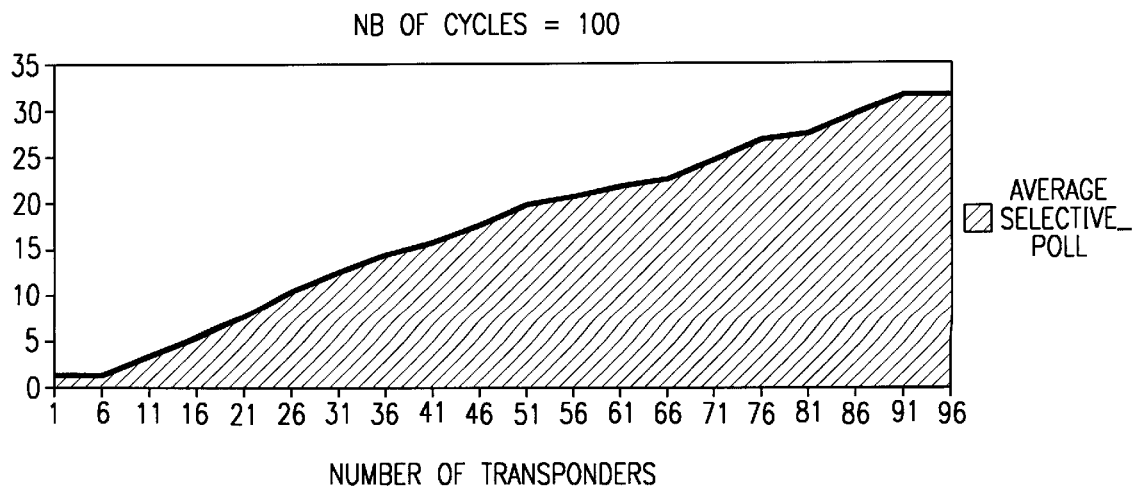
FIGS. 6 and 7 show the raw data and a graphed curve of the data which shows the number of Selective Poll Commands required to inventory a number of transponders.

The simulation results shown in FIGS. 6–7 were obtained with a software simulator written in Microsoft Visual Basic. FIG. 6 shows one workbook page in developed in Excel and FIG. 7 provides a graphical representation of this data. The valuable information that this simulation provides is that the average number of Selective Poll Commands that are required to inventory a number of transponders between 2 and 300 is always less than 0.4 per transponder using the algorithm according to a first preferred embodiment of the invention. The total time required is thus less than 0.4*T*Selective_Poll_Command_time+T*transponder_response_time, ensuring identification of all the transponders, where T is the number of transponders in the field, Selective_Poll_Command_time is the time duration of a Selective Poll Command and transponder_response_time is the time duration of a transponder response. If we assume the same values as in the calculation above, the average time to inventory 20 transponders is: 0.4*20*50 ms+20*30 ms=400 ms+600 ms=1 s versus the more than 13s required by prior art systems as described previously when describing prior art methods of addressing a multiplicity of transponders.

I claim:

1. A method of identifying a multitude of transponders within a given interrogation field of an RF-ID system comprising the steps of:

transmitting a first series of powering interrogation pulses comprised of addresses for enabling the transponders, wherein said transponders have unique identification codes and have an address assimilated from at least one bit of said identification code and respond if said address matches said address transmitted from an interrogator;

listening for responses from said transponders and upon receipt of unintelligible responses at some addresses, then storing said addresses in said memory;

transmitting a second series of powering interrogation pulses comprised of addresses wherein said addresses comprise a concatenation of a mask and a sub-address, and said mask comprises one of said stored addresses and said sub-address comprises a successive series of addresses;

listening for responses from said transponders and upon receipt of unintelligible responses at some addresses comprised of said concatenation of said mask and sub-address, then storing said addresses comprised of a concatenation of said mask and sub-addresses in said memory; and wherein said steps of listening for responses and receipt of unintelligible responses at some address and storing said concatenation of said mask and sub-address which comprise said address and said step of transmission of a series of interrogation pulses comprised of addresses wherein said addresses comprises a concatenation of said mask and sub-address wherein said mask comprises one of said stored addresses and said sub-address comprises a successive series of addresses repeats until the interrogator fails to receive an unintelligible response.

2. The method of claim 1, wherein said successive series of addresses comprises the addresses from 0 to $2^{sub\text{-}address\text{-}size}-1$.

3. The method of claim 1, wherein the interrogator transmits a fixed size sub-address and a variable size mask.

4. The method of claim 3, wherein with each transmission of said interrogation pulses, said mask size increases.

5. The method of claim 1, further comprising step of determining an amount of time it takes to identify T transponders is $0.4*T*Selective\_Poll\_Command\_time+T*transponder\_response\_time$, wherein transponder_response_time is the amount of time it takes for a transponder to respond and Selective Poll Command time is the duration of the interrogation powering pulse.

6. The method of claim 1, wherein said first series of interrogation pulses, mask size is null.

7. The method of claim 4, wherein said mask size increases as a result of collisions resulting at some collision addresses wherein said collision addresses are comprised of a concatenation of said mask and sub-address, and said concatenation of mask and sub-address becomes the mask for the next series of interrogation pulses.

8. The method of claim 1, wherein said sub-addresses are also assimilated from at least one bit of said transponder identification code.

9. The method of claim 1, wherein upon being identified, said transponder receives a quiet command along with it's address for disabling said transponder until further notice.

10. A method of identifying a multitude of transponders within a given interrogation field of an RF-ID system comprising the steps of:

transmitting a powering interrogation pulse and addresses within an interrogation field to transponders within said field for enabling the transponders, wherein said transponders have unique identification codes and have an address assimilated from at least one bit of said identification code and respond if said address matches said address transmitted from an interrogator;

listening for responses from said transponders and upon receipt of an unintelligible response, transmitting a command instructing said transponders in said field as yet unidentified to use as a sub-address a different set of bits within said identification code;

transmitting a powering interrogation pulse and a successive series of addresses within an interrogation field to transponders within said field for enabling the transponders;

listening for responses from said transponders wherein said transponders respond upon receipt of said address from said interrogator which matches said transponder's sub-address, and;

wherein said listening for responses and receipt of unintelligible responses and transmission of said command instructing said transponders in said field as yet unidentified to use as a sub-address a different set of bits within said identification code than previously used and transmission of a successive series of addresses repeats until the interrogator fails to receive an unintelligible response.

11. The method according to claim 10, wherein said successive series of addresses comprise the addresses from 0 to $2^{sub\text{-}address\text{-}size}-1$.

12. The method according to claim 10, wherein the interrogator transmits a fixed size address and a variable position mask.

13. The method according to claim 12, wherein with each transmission of said interrogation pulses, said mask position changes.

14. The method according to claim 10, wherein said sub-addresses are also assimilated from at least one bit of said transponder identification code.

15. The method according to claim 10, wherein upon being identified, said transponder receives a quiet command along with it's address for disabling said transponder until further notice.

16. A method of identifying a multitude of remote units within a given network in a data information transfer system comprising the steps of:

polling said network comprised of a command center and remote stations with a particular address of at least one station, wherein said stations have unique identification codes and have an address assimilated from at least one bit of said identification code and respond if said address matches said address transmitted from said command center;

receiving an unintelligible response indicative of more than one station having said particular address;

transmitting a command instructing said stations on said network as yet unidentified to use as a sub-address a different set of bits within said identification code;

transmitting a successive series of addresses;

polling for responses from said stations wherein said stations respond upon receipt of said address from said command center which matches said station's sub-address;

wherein said polling for responses and receipt of unintelligible responses and transmission of said command instructing said stations in said field as yet unidentified to use as a sub-address a different set of bits within said identification code than previously used and transmission of a successive series of addresses repeats until the command center fails to receive an unintelligible response.

17. The method according to claim 16, wherein said successive series of addresses comprise the addresses from 0 to $2^{sub\text{-}address\text{-}size}-1$.

18. The method according to claim 16, wherein the command center transmits a fixed size address and a variable position mask.

19. The method according to claim 18, wherein with each transmission of said command, said mask position changes.

20. The method according to claim 16, wherein said successive series of addresses are also assimilated from at least one bit of said station identification code.

21. The method according to claim 16, wherein upon being identified, said station receives a quiet command along with it's address for disabling said station until further notice.

22. A method of identifying a multitude of remote units within a given network in a data information transfer system comprising the steps of:

polling said network comprised of a command center and remote stations with a particular address of at least one station, wherein said stations have unique identification codes and have an address assimilated from at least one bit of said identification code and respond if said address matches said address transmitted from said command center;

listening for responses from said stations and upon receipt of unintelligible responses at some addresses, then storing said addresses in said memory;

transmitting a second series of polls pulses comprised of addresses wherein said addresses comprise a concatenation of a mask and a sub-address, and said mask comprises one of said stored addresses and said sub-address comprises a successive series of addresses;

listening for responses from said stations and upon receipt of unintelligible responses at some addresses comprised of said concatenation of said mask and sub-address, then storing said addresses comprised of a concatenation of said mask and sub-addresses in said memory; and wherein said steps of listening for responses and receipt of unintelligible responses at some address and storing said concatenation of said mask and sub-address which comprise said address and said step of transmission of a series of interrogation pulses comprised of addresses wherein said addresses comprises a concatenation of said mask and sub-address wherein said mask comprises one of said stored addresses and said sub-address comprises a successive series of addresses repeats until the command center fails to receive an unintelligible response.

23. The method of claim 22, wherein said successive series of addresses comprises the addresses from 0 to $2^{sub\text{-}address\text{-}size} - 1$.

24. The method of claim 22, wherein the command center transmits a fixed size sub-address and a variable size mask.

25. The method of claim 24, wherein with each transmission of said polls, said mask size increases.

26. The method of claim 22, further comprising step of determining an amount of time it takes to identify T stations is $0.4 * T * Selective\_Poll\_Command\_time + T * station\_response\_time$, wherein station_response_time is the amount of time it takes for a station to respond and Selective Poll Command time is the duration of the poll.

27. The method of claim 24, wherein said first series of polls, mask size is null.

28. The method of claim 25, wherein said mask size increases as a result of collisions resulting at some collision addresses wherein said collision addresses are comprised of a concatenation of said mask and sub-address, and said concatenation of mask and sub-address becomes the mask for the next series of polls.

29. The method of claim 22, wherein said sub-addresses are also assimilated from at least one bit of said station identification code.

30. The method of claim 22, wherein upon being identified, said station receives a quiet command along with it's address for disabling said station until further notice.

* * * * *